(12) United States Patent
Hagiwara et al.

(10) Patent No.: US 12,541,945 B2
(45) Date of Patent: Feb. 3, 2026

(54) MONITORING DEVICE, MONITORING SYSTEM, AND MONITORING METHOD

(71) Applicant: Socionext Inc., Kanagawa (JP)

(72) Inventors: Soichi Hagiwara, Yokohama (JP); Tatsuro Osada, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 15 days.

(21) Appl. No.: 18/749,253

(22) Filed: Jun. 20, 2024

(65) Prior Publication Data

US 2025/0078447 A1 Mar. 6, 2025

(30) Foreign Application Priority Data

Sep. 6, 2023 (JP) ................ 2023-144049

(51) Int. Cl.
*G06V 10/60* (2022.01)
*B60R 25/04* (2013.01)
(Continued)

(52) U.S. Cl.
CPC .............. *G06V 10/60* (2022.01); *B60R 25/04* (2013.01); *B60R 25/305* (2013.01); *G06V 40/20* (2022.01); *H04N 25/707* (2023.01)

(58) Field of Classification Search
CPC ......... Y10S 707/99933; Y10S 715/968; G08B 13/19602; G08B 13/19606; G08B 13/19641; G05D 1/0094; G05D 1/1064; G05D 1/689; G05D 1/693; H04N 23/69; H04N 19/117; H04N 19/142; H04N 19/159; H04N 19/172; H04N 19/46; H04N 19/87; H04N 23/11; H04N 23/45; H04N 23/60; H04N 23/667; H04N 23/84; H04N 25/131; H04N 5/147; H04N 5/265; H04N 5/275; H04N 7/181; H04N 7/183; H04N 9/43; H04N 9/646; H04N 25/443; H04N 25/707; H04N 23/651; H04N 23/71; H04N 23/73; H04N 7/188; G06N 20/00; G06N 3/045; G06V 20/10; G06V 20/64; G06V 10/774; G06V 10/776; G06V 10/56; G06V 20/52; G06V 10/255; G06V 10/40; G06V 10/457; G06V 10/751; G06V 10/7515; G06V 10/758; G06V 10/759; G06V 10/82;
(Continued)

(56) References Cited

U.S. PATENT DOCUMENTS

2020/0244931 A1* 7/2020 Yao .................. G06T 7/0002
2022/0166958 A1* 5/2022 Hoshino ............ H04N 23/60
(Continued)

FOREIGN PATENT DOCUMENTS

JP 2012-044404 A 3/2012
JP 2014-211734 A 11/2014
(Continued)

*Primary Examiner* — Dionne Pendleton
(74) *Attorney, Agent, or Firm* — Rimon P.C.

(57) ABSTRACT

A monitoring device includes a memory; and a processor configured to execute a process including acquiring image data indicating a change in intensity of incident light from a sensor array, determining a first region to be monitored and a second region not to be monitored in a field of view of the sensor array, and outputting a monitoring result of a moving object based on the image data acquired by the sensor array in the first region.

16 Claims, 13 Drawing Sheets

(51) Int. Cl.
*B60R 25/30* (2013.01)
*G06V 40/20* (2022.01)
*H04N 25/707* (2023.01)

(58) Field of Classification Search
CPC ...... G06V 10/141; G06V 10/28; G06V 10/34; G06V 10/454; G06V 10/62; G06V 10/955; G06V 20/17; G06V 20/41; G06V 20/46; G06V 20/49; G06V 20/54; G06V 30/10; G06V 30/1478; G06V 30/148; G06V 30/18095; G06V 30/19147; G06V 30/19173; G06V 30/413; G06V 30/416; G06V 40/103; G06V 40/107; G06V 10/60; G06V 40/20; G06T 2207/20081; G06T 5/60; G06T 15/06; G06T 19/20; G06T 2219/2024; G06T 5/70; G06T 7/11; G06T 7/40; G06T 7/60; G06T 2207/10016; G06T 7/246; G06T 2207/20224; G06T 2207/30232; G06T 5/50; G06T 1/20; G06T 2200/28; G06T 2207/10024; G06T 2207/10028; G06T 2207/10048; G06T 2207/20036; G06T 2207/20084; G06T 2207/30241; G06T 5/40; G06T 5/77; G06T 5/92; G06T 7/136; G06T 7/194; G06T 7/277; G06T 7/50; G06T 7/62; G06T 7/73; G06T 9/00; G06T 2207/30148; G06T 2207/30168; G06T 7/0002; G06T 7/0004; G06T 7/248; G06T 7/254; G06T 7/80; G06F 18/217; G06F 18/214; G06F 16/5838; G06F 16/5854; G06F 16/71; G06F 16/785; G06F 18/211; G06F 18/22; G06F 18/2415; G06F 3/017; G06F 3/0304; G06F 40/216; G06F 40/284; G06F 40/30; B60R 25/04; B60R 25/305; H01L 21/02; H01L 21/027; H01L 21/304; H01L 21/67028; H01L 21/67034; H01L 21/67051; H01L 21/67253

See application file for complete search history.

(56) References Cited

U.S. PATENT DOCUMENTS

| | | | |
|---|---|---|---|
| 2022/0264035 A1* | 8/2022 | Berner | H04N 25/00 |
| 2023/0419692 A1 | 12/2023 | Taguchi et al. | |
| 2024/0161443 A1 | 5/2024 | Okuike | |
| 2025/0069922 A1* | 2/2025 | Okamoto | H01L 21/304 |

FOREIGN PATENT DOCUMENTS

| | | |
|---|---|---|
| JP | 2022-163480 A | 10/2022 |
| JP | 2023-009057 A | 1/2023 |
| JP | 2023-061207 A | 5/2023 |
| WO | 2022/190470 A1 | 9/2022 |
| WO | 2022/201973 A1 | 9/2022 |

* cited by examiner

MONITORING DEVICE, MONITORING SYSTEM, AND MONITORING METHOD

CROSS-REFERENCE TO RELATED APPLICATIONS

The present application is based upon and claims the benefit of priority under 35 U.S.C. § 119 of Japanese Patent Application No. 2023-144049 filed on Sep. 6, 2023, the entire contents of which are hereby incorporated by reference.

TECHNICAL FIELD

The present disclosure relates to a monitoring device, a monitoring system, and a monitoring method.

BACKGROUND ART

In image sensors, event-based vision sensors (EVS: Event-based Vision Sensor) are known to detect changes in the brightness of each pixel. In addition, for example, a camera may be often installed in a vehicle for the purpose of theft prevention.

RELATED ART DOCUMENTS

Patent Documents

[Patent Document 1] WO 2022/201973
[Patent Document 2] Japanese Unexamined Patent Application Publication No. 2023-009057
[Patent Document 3] Japanese Unexamined Patent Application Publication No. 2023-061207
[Patent Document 4] Japanese Unexamined Patent Application Publication No. 2022-163480
[Patent Document 5] WO 2022/190470
[Patent Document 6] Japanese Unexamined Patent Application Publication No. 2014-211734
[Patent Document 7] Japanese Unexamined Patent Application Publication No. 2012-044404

SUMMARY

According to an aspect of the present disclosure, a monitoring device is provided. The monitoring device includes a memory; and a processor configured to execute a process including acquiring image data indicating a change in intensity of incident light from a sensor array, determining a first region to be monitored and a second region not to be monitored in a field of view of the sensor array, and outputting a monitoring result of a moving object based on the image data acquired by the sensor array in the first region.

EMBODIMENTS OF THE INVENTION

In the related-art technologies, when the engine of the vehicle is stopped, the devices installed in the vehicle are operated by the vehicle-mounted battery. However, since the capacity of the vehicle-mounted battery is limited, long-time monitoring using the vehicle-mounted camera may be limited.

Therefore, an event-based vision sensor (hereinafter referred to as "EVS") can be used as a monitoring camera to reduce power in a monitoring system. However, when the EVS is used as a monitoring camera, for example, the monitoring system may not sufficiently exhibit power-efficiency because the monitoring camera is activated when a moving object, such as a passerby or a moving vehicle, is present in the field of view of the monitoring camera.

Accordingly, it is desirable to provide a monitoring system capable of exhibiting a sufficient power saving effect using an EVS as a monitoring camera.

It is desirable to provide a monitoring system capable of exhibiting a sufficient power saving effect using an EVS as a monitoring camera.

According to at least one aspect of an embodiment of the present disclosure, a monitoring system capable of exhibiting a sufficient power saving effect using an EVS as a monitoring camera can be provided.

Hereinafter, embodiments of the present disclosure will be described with reference to the accompanying drawings.

System Configuration

Figure 1:
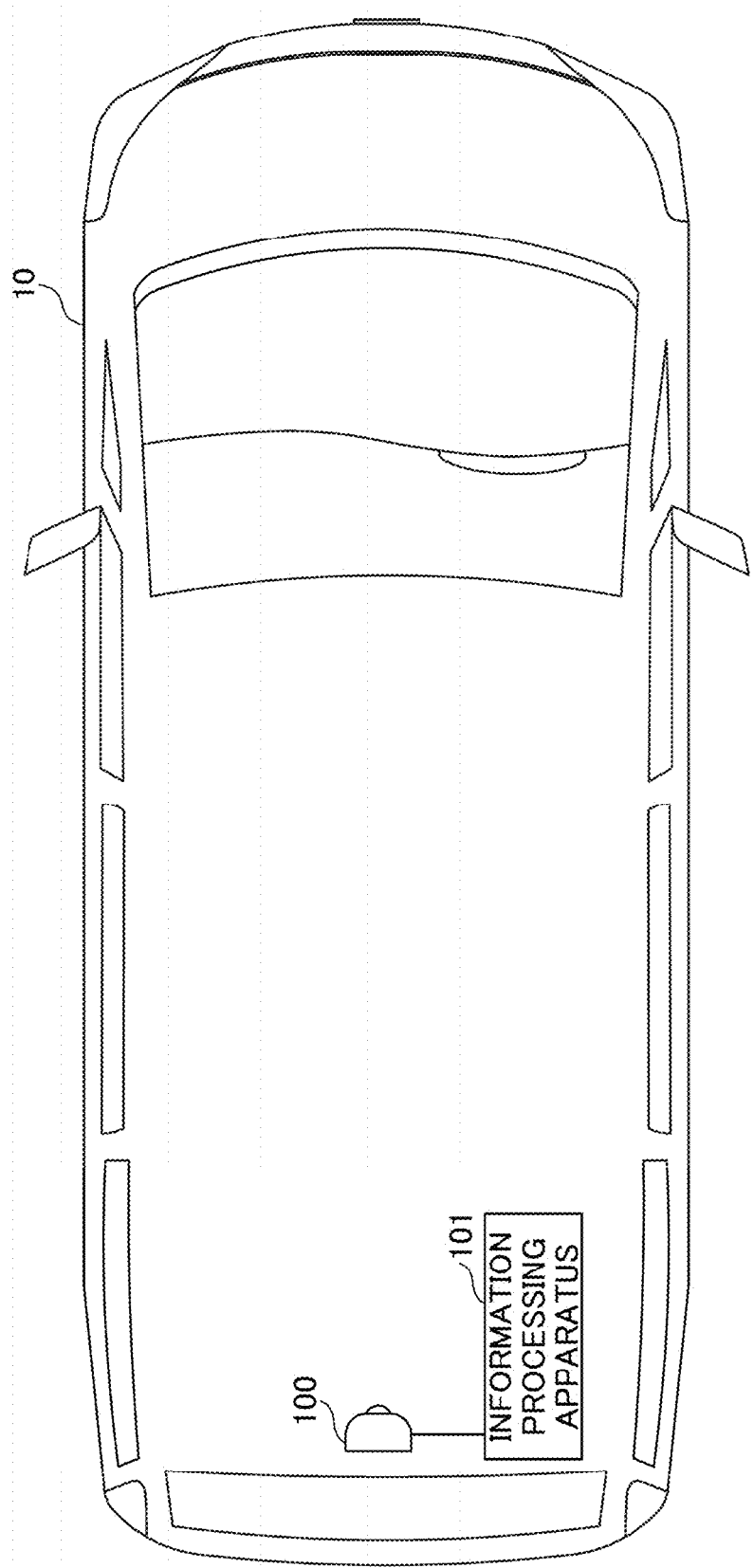
FIG. 1 is a diagram illustrating an example of a system configuration of a monitoring system according to an embodiment.

FIG. 1 is a diagram illustrating an example of a system configuration of a monitoring system according to an embodiment. In the example of FIG. 1, a monitoring system 1 includes a monitoring device 100 and an information processing apparatus 101 installed in a vehicle 10 such as an automobile.

The monitoring device 100 is a monitoring camera that acquires EVS image data indicating a change in luminance (hereinafter also referred to as "luminance change") in a vehicle cabin of the vehicle 10 using an event-based vision sensor (EVS), or a device including the monitoring camera. An event-based vision sensor (hereinafter referred to as EVS) is an image sensor that detects a luminance change of each pixel and outputs only changed data in combination with "coordinates" and "time information". The EVS may be referred to as another name such as a dynamic vision sensor.

In the example of FIG. 1, the monitoring device 100 is installed at the rear of the vehicle cabin of the vehicle 10, and acquires EVS image data (hereinafter, referred to as image data) of the vehicle cabin from the rear of the vehicle cabin. The monitoring device 100 monitors a moving object in the vehicle cabin of the vehicle 10 based on the acquired image data and outputs a monitoring result of the moving object to the information processing apparatus 101.

The information processing apparatus 101 is a computer that executes a predetermined process based on the monitoring result of the moving object output by the monitoring device 100. The information processing apparatus 101 may be an electronic control unit (ECU) included in the vehicle 10 or may be a computer different from the electronic control unit included in the vehicle 10. The electronic control unit may be a CPU included in the vehicle 10.

The information processing apparatus 101 determines whether or not the detected moving object is a suspicious person based on the monitoring result of the moving object output by the monitoring device 100. In addition, when determining that the detected moving object is a suspicious person, the information processing apparatus 101 outputs warning information to a predetermined output destination.

Outline of Processing

Figure 2:
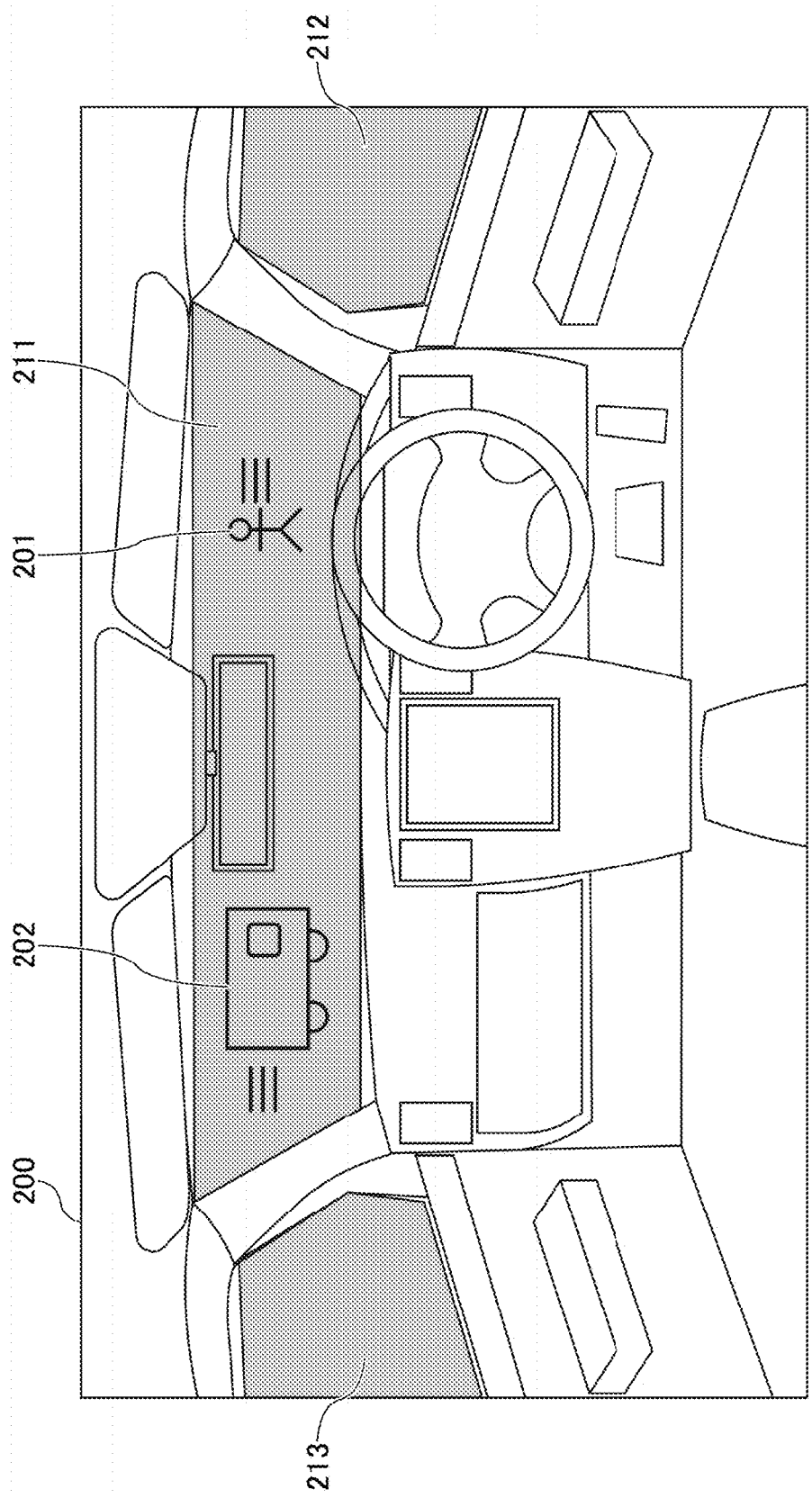
FIG. 2 is a diagram for explaining an outline of processing according to the embodiment.

FIG. 2 is a diagram for explaining an outline of processing according to the embodiment. A reference numeral 200 in FIG. 2 indicates an image of a field of view of the EVS provided in the monitoring device 100. In this example, the monitoring device 100 is installed such that a driver's seat, a windshield 211, side windows 212 and 213, and the like are within the field of view of the EVS from the rear of the vehicle cabin of the vehicle 10.

The EVS detects a luminance change of each pixel, and outputs image data indicating the luminance change when the luminance change of the pixel exceeds a predetermined value. Since the luminance change of the pixel occurs when the subject moves, the EVS does not output image data when there is no moving object in the field of view of the EVS.

Therefore, the use of the EVS as a monitoring camera may reduce the power of the monitoring system. For example, the information processing apparatus 101 is set to a power saving state when the monitoring result of the moving object is not input, and is activated when the monitoring result of the moving object is input from the monitoring device 100, thereby reducing the power consumption of the information processing apparatus 101 in a case where the moving object is not present in the visual field of the EVS.

However, for example, when the vehicle 10 is parked near a road with heavy traffic, as illustrated in FIG. 2, a pedestrian 201, another vehicle 202, or the like passing on the road may enter the field of view of the EVS via the windshield 211 or the like. In this case, even when no moving object is present in the vehicle cabin of the vehicle 10, the EVS outputs the monitoring result of the moving object and the information processing apparatus 101 is activated, thereby failing to obtain a sufficient power saving effect.

Therefore, the monitoring device 100 according to the present embodiment has a function of setting a region where the luminance change is frequent, as the windshield 211 and the side windows 212 and 213, as a non-monitoring region, and setting a region other than the non-monitoring region as the monitoring region. The monitoring device 100 monitors the monitoring region, and outputs a detection result of a moving object to the information processing apparatus 101 when detecting the moving object in the monitoring region.

Thus, when no moving object is present in the vehicle cabin of the vehicle 10, the monitoring device 100 does not output the monitoring result of the moving object due to the pedestrian 201, another vehicle 202, or the like passing on the road, thereby preventing unnecessary activation of the information processing apparatus 101.

As described above, according to the present embodiment, a sufficient power saving effect can be obtained in the monitoring system 1 using the EVS as a monitoring camera.

Functional Configuration

Figure 3:
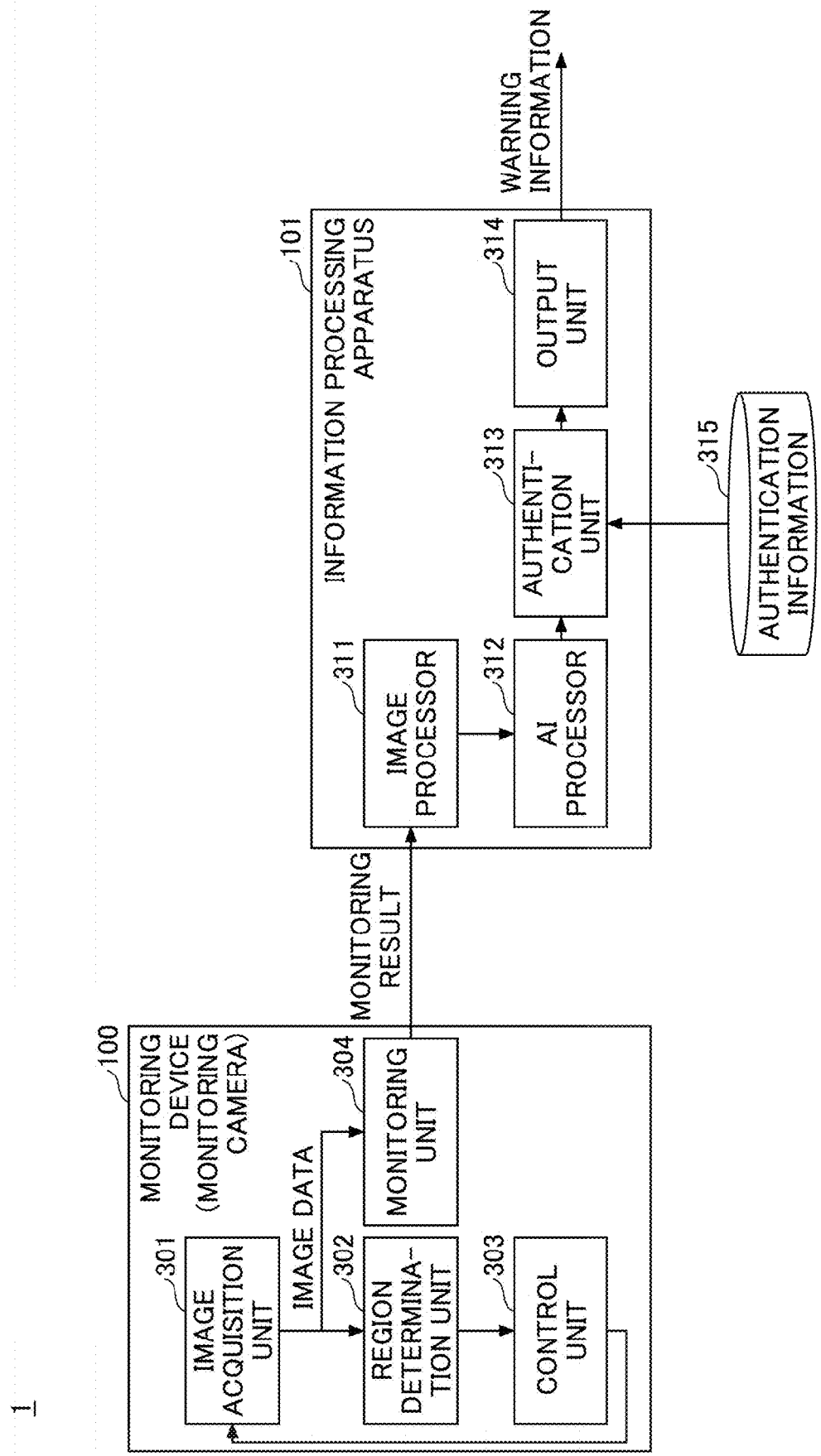
FIG. 3 is a diagram (1) illustrating an example of a functional configuration of a monitoring system according to the embodiment.

FIG. 3 is a diagram (1) illustrating an example of a functional configuration of a monitoring system according to the embodiment. FIG. 3 illustrates an example of the functional configuration of the monitoring system 1 in a case where the monitoring device 100 is a monitoring camera.

Functional Configuration of Monitoring Device

In the example of FIG. 3, the monitoring device (monitoring camera) 100 includes functional components such as an image acquisition unit 301, a region determination unit 302, a control unit 303, and a monitoring unit 304.

The image acquisition unit 301 is implemented by, for example, a light receiving element (sensor array) of the EVS, and executes image acquisition processing of acquiring image data indicating a change in intensity of incident light (a change in luminance). For example, the image acquisition unit 301 determines whether or not a change in luminance of light captured for each pixel exceeds a predetermined value, and acquires image data (EVS image data) indicating the change in the luminance of the pixel exceeding the predetermined value.

The region determination unit 302 executes region determination processing of determining a monitoring region (first region) to be monitored and a non-monitoring region (second region) not to be monitored in the field of view of the image acquisition unit 301 (field of view of the EVS). For example, the region determination unit 302 sets a region where the frequency of luminance changes is equal to or greater than a threshold in the image data acquired by the image acquisition unit 301 as a non-monitoring region (second region), and sets a region where the frequency of luminance changes is less than the threshold as the monitoring region (first region).

The region determination unit 302 may be implemented by a program executed by a computer included in the monitoring device 100 or may be implemented by hardware included in the monitoring device 100.

The control unit 303 executes control processing of controlling the region in the field of view of the image acquisition unit 301 from which the image acquisition unit 301 acquires image data, based on the monitoring region and the non-monitoring region determined by the region determination unit 302. The control unit 303 is implemented by, for example, hardware or the like configured on the EVS included in the monitoring device 100.

Figure 4:
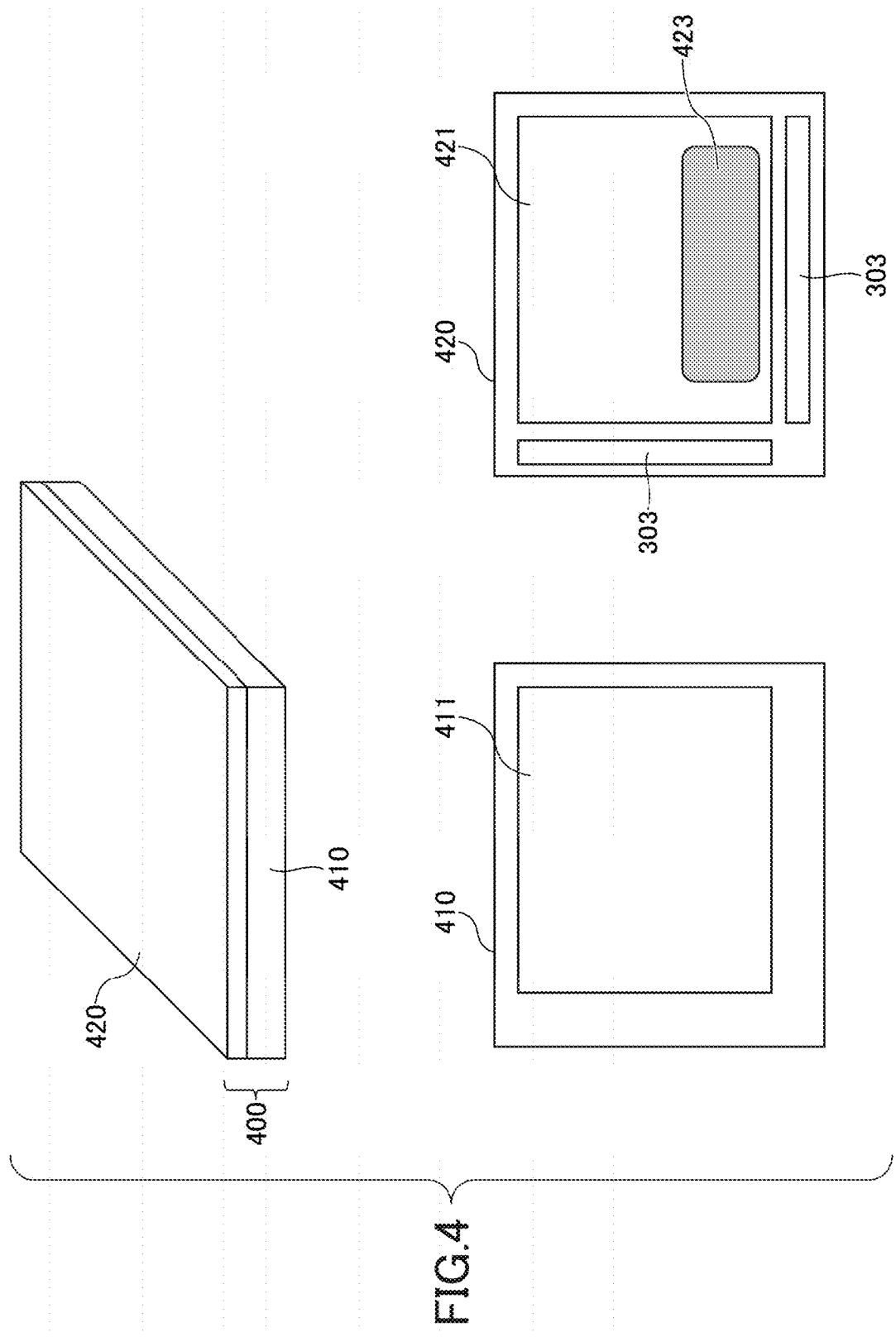
FIG. 4 is a diagram illustrating a configuration example of an EVS according to the embodiment.

FIG. 4 is a diagram illustrating a configuration example of an EVS according to the embodiment. In the EVS 400 according to the present embodiment, for example, a mask 420 is disposed on a light receiving unit 410 including a sensor array 411. The mask 420 includes, for example, a light shielding unit 421 including liquid crystals whose light transmittance changes by application of a voltage, and the control unit 303 that controls the light shielding unit 421. The light shielding unit 421 is disposed so as to overlap the sensor array 411 in a plan view, and can reduce the transmittance of light (shield light) in any region 423 of the sensor array 411 according to the control from the control unit 303. The control unit 303 may be provided in the light receiving unit 410 instead of the mask 420.

In the example of FIG. 4, the control unit 303 controls the light shielding unit 421 so that the transmittance of light is reduced at a position corresponding to the non-monitoring region of the sensor array 411. Accordingly, the control unit 303 can perform control so as to block light received by the light receiving element corresponding to the non-monitoring region in the sensor array 411, prevent a luminance change, and not to monitor a moving object in the non-monitoring region.

The configuration of the EVS 400 illustrated in FIG. 4 is an example. For example, the control unit 303 may control a region where the image acquisition unit 301 acquires the image data by software executed by a computer included in the monitoring device 100, a signal processing circuit, a digital signal processor (DSP), or the like.

Returning to FIG. 3, the functional configuration of the monitoring device 100 will be further described. The monitoring unit 304 executes monitoring processing of outputting a moving object monitoring result based on the image data acquired by the image acquisition unit 301 in the monitoring region (first region) determined by the region determination unit 302. For example, the monitoring unit 304 monitors a luminance change of the image data acquired by the image acquisition unit 301 in the monitoring region, and outputs information on the luminance change of the acquired image data to the information processing apparatus 101 as a monitoring result. Here, when the luminance change does not occur in the monitoring region or when the luminance change is less than the threshold, the monitoring unit 304 does not output a monitoring result to the information processing apparatus 101. The monitoring unit 304 may set the threshold so that a luminance change caused by noise can be excluded, for example.

Functional Configuration of Information Processing Apparatus

The information processing apparatus 101 includes, for example, an image processor 311, an artificial intelligence (AI) processor 312, an authentication unit 313, and an output unit 314.

The image processor 311 performs image processing such as noise removal on the monitoring result (the image indicating the luminance change) acquired from the monitoring unit 304. The image processor 311 is implemented by, for example, a program executed by a computer included in the information processing apparatus 101 or a signal processing circuit.

The AI processor 312 determines whether or not a region to be monitored (e.g., the vehicle cabin of the vehicle 10 or the like) is safe in the monitoring result subjected to the image processing by the image processor 311, and outputs the monitoring result to the authentication unit 313 when determining that the region is not safe. For example, the AI processor 312 inputs the monitoring result subjected to the image processing by the image processor 311 to a machine learning model that has trained in advance using a plurality of monitoring results, training data indicating whether each monitoring result is safe, and the like, and determines whether the monitoring result is safe. For example, the AI processor 312 may determine that the monitoring result is not safe when a person is included in the monitoring result subjected to the image processing by the image processor 311. The AI processor 312 is implemented by, for example, a program executed by a computer included in the information processing apparatus 101.

The authentication unit 313 compares the monitoring result acquired from the AI processor 312 with the authentication information 315, and determines whether the person included in the monitoring result is a valid user or a suspicious person. The authentication unit 313 is implemented by, for example, a program executed by a computer included in the information processing apparatus 101.

When the authentication unit 313 determines that the person included in the monitoring result is not a valid user (when the person is determined to be a suspicious person), the output unit 314 outputs warning information. The output unit 314 is implemented by, for example, a program executed by a computer included in the information processing apparatus 101. An example of specific processing executed by the monitoring system 1 in response to the warning information will be described later.

The functional configuration of the monitoring system 1 described with reference to FIG. 3 is an example. For example, the monitoring system 1 may have a functional configuration as illustrated in FIG. 5.

Figure 5:
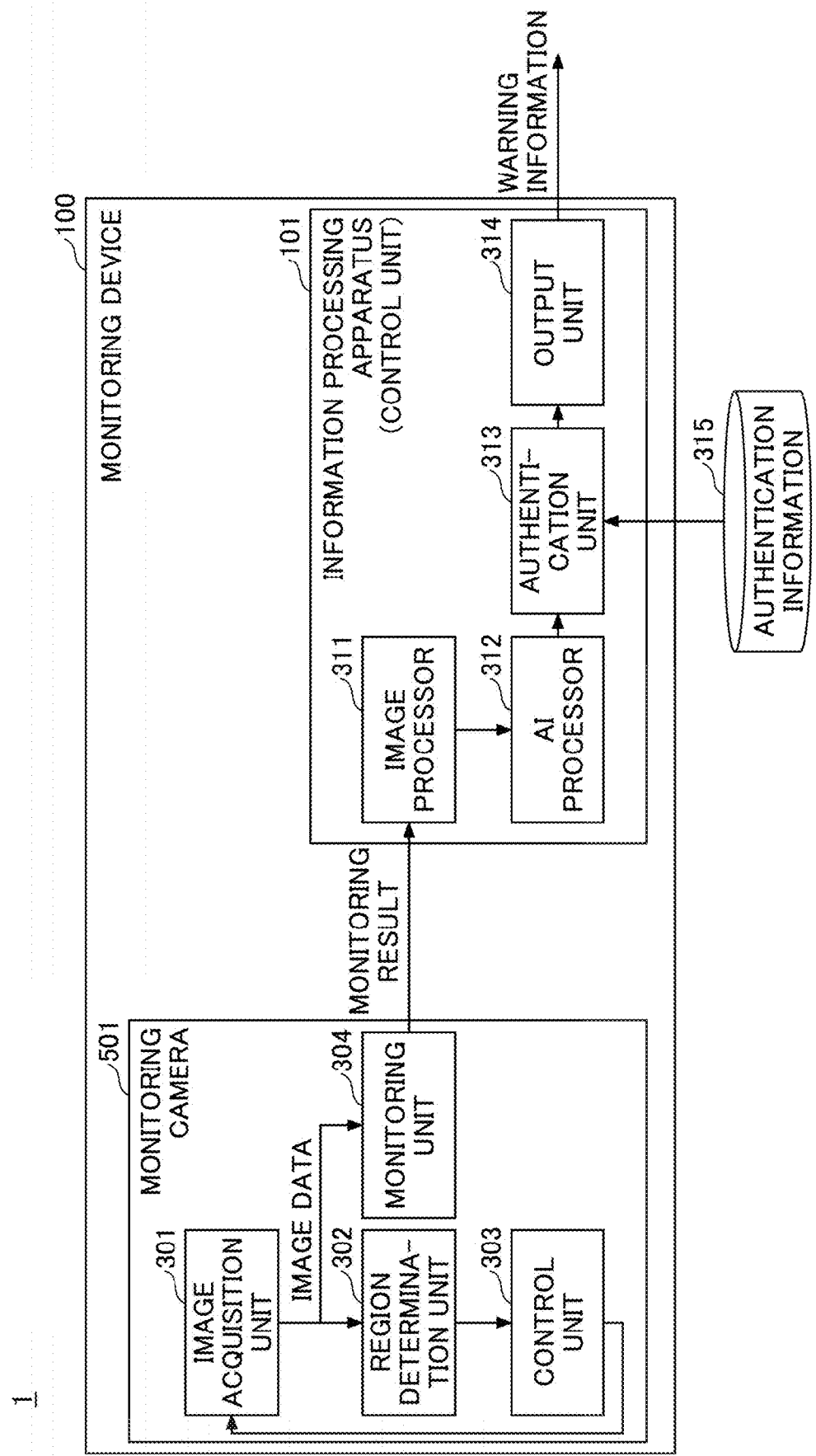
FIG. 5 is a diagram (2) illustrating an example of a functional configuration of a monitoring system according to the embodiment.

FIG. 5 is a diagram (2) illustrating an example of a functional configuration of the monitoring system according to the embodiment. In the example of FIG. 5, the monitoring device 100 includes a monitoring camera 501 and an information processing apparatus (control unit) 101.

In FIG. 5, the monitoring camera 501 includes the image acquisition unit 301, the region determination unit 302, the control unit 303, and the monitoring unit 304, as in the monitoring device (monitoring camera) 100 described in FIG. 3. The information processing apparatus (control unit) 101 includes the image processor 311, the AI processor 312, the authentication unit 313, and the output unit 314, as in the information processing apparatus 101 described with reference to FIG. 3. In this way, the information processing apparatus 101 may be included in the monitoring device 100 as a control unit of the monitoring device 100.

Flowchart of Processing

Next, a flowchart of processing of the monitoring method according to the present embodiment will be described.

First Embodiment

Monitoring Processing

Figure 6:
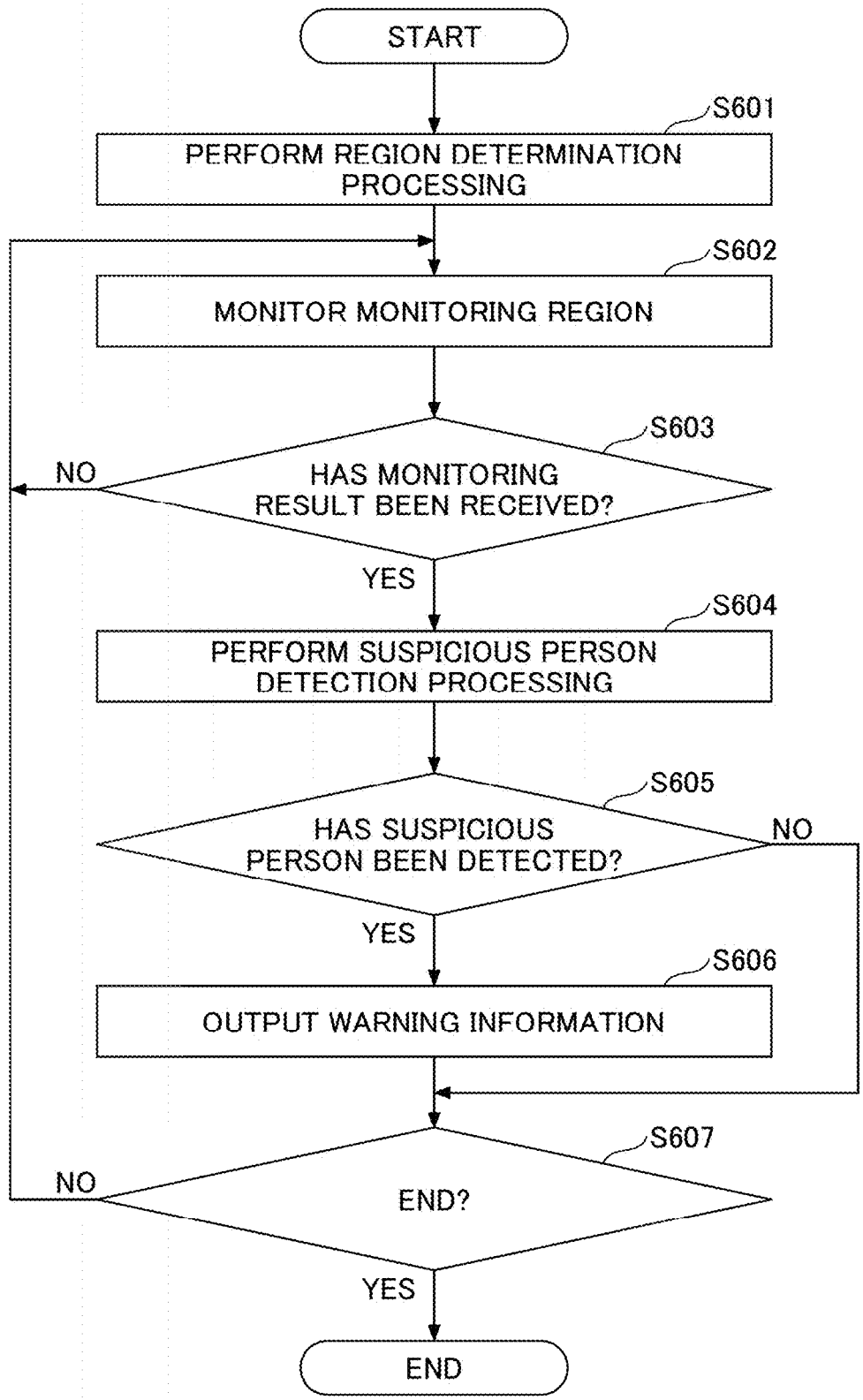
FIG. 6 is a flowchart illustrating an example of monitoring processing according to a first embodiment.

FIG. 6 is a flowchart illustrating an example of monitoring processing according to the first embodiment. This processing is an example of monitoring processing executed by the monitoring system 1 having the functional configuration as illustrated in FIG. 3 or 5.

In step S601, the region determination unit 302 executes region determination processing of determining a monitoring region (first region) in which a moving object (or luminance change) is monitored and a non-monitoring region (second region) in which a moving object is not monitored in the field of view of the image acquisition unit 301. As an example, as described in FIG. 2, the region determination unit 302 sets a region where the luminance change is frequent, such as the windshield 211 and the side windows 212 and 213 of the vehicle 10, as the non-monitoring region, and sets a region other than the non-monitoring region as the monitoring region. An example of specific processing contents of the region determination processing will be described later.

In step S602, the monitoring device 100 monitors the monitoring region determined by the region determination unit 302. For example, the control unit 303 controls the light shielding unit 421 described with reference to FIG. 4 to shield the non-monitoring region determined by the region determination unit 302 from light. Thus, the image acquisition unit 301 acquires image data indicating a luminance change of a pixel exceeding a predetermined value in the monitoring region determined by the region determination unit 302. The monitoring unit 304 monitors the luminance change of the image data acquired by the image acquisition unit 301 in the monitoring region, and outputs information on the luminance change of the acquired image data to the information processing apparatus 101 as a monitoring result (a result of monitoring a moving object) when there is the luminance change.

In step S603, when the information processing apparatus 101 has received the monitoring result from the monitoring unit 304, the information processing apparatus 101 executes the processing in step S604 and subsequent steps. On the other hand, when the information processing apparatus 101 has not received the monitoring result from the monitoring unit 304, the monitoring system 1 returns the processing to step S602.

In step S604, the information processing apparatus 101 performs suspicious person detection processing of detecting a suspicious person based on the monitoring result received from the monitoring unit 304. An example of specific processing contents of the suspicious person detection processing will be described later.

In step S605, when a suspicious person has been detected in the suspicious person detection processing, the information processing apparatus 101 shifts the processing to step S606. On the other hand, when the suspicious person has not been detected in the suspicious person detection processing, the information processing apparatus 101 shifts the processing to step S607.

In step S606, the output unit 314 outputs warning information to a predetermined destination.

In step S607, the monitoring system 1 determines whether or not to end the monitoring processing. For example, the monitoring system 1 may determine to end the monitoring processing when the ignition power supply of the vehicle 10 is turned on. When the monitoring processing is to be ended, the monitoring system 1 ends the processing of FIG. 6. On the other hand, when the monitoring processing is not to be ended, the monitoring system 1 returns the processing to step S602.

By the processing of FIG. 6, the monitoring system 1 can suppress unnecessary activation of the information processing apparatus 101 when there is no luminance change in the monitoring region determined in step S601 (when no moving object is present in the vehicle cabin of the vehicle 10).

The monitoring processing illustrated in FIG. 6 is an example. For example, the monitoring device 100 may update the monitoring region and the non-monitoring region by executing the region determination processing again when a predetermined time has elapsed after executing the region determination processing in step S601.

Region Determination Processing

Figure 7:
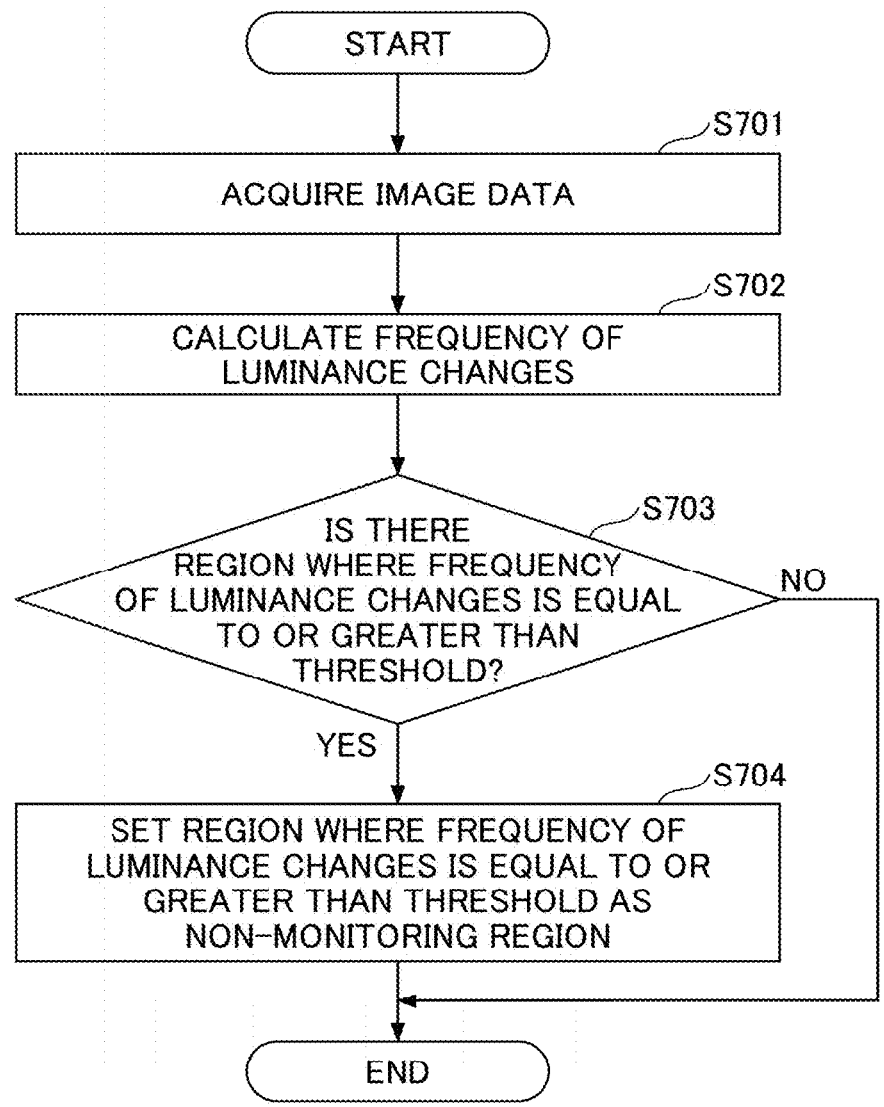
FIG. 7 is a flowchart illustrating an example of region determination processing according to the first embodiment.

FIG. 7 is a flowchart illustrating an example of the region determination processing according to the first embodiment. This processing is an example of the region determination processing executed the by region determination unit 302 in step S601 of FIG. 6, for example.

In step S701, the region determination unit 302 acquires image data in a predetermined period from the image acquiring unit 301 in a state where the non-monitoring region is not set. Here, the "predetermined period" may be a predetermined fixed value (e.g., about several seconds to several minutes), or may be dynamically determined by the region determination unit 302 according to the presence or absence of a luminance change.

In step S702, the region determination unit 302 calculates the frequency of luminance changes for each region. Here, the "region" may be determined by the region determination unit 302 as a region including pixels in which the magnitude of the luminance change is equal to or greater than a predetermined value, or may be a mesh-like region having a predetermined size, for example.

In step S703, the region determination unit 302 determines whether there is a region where the frequency of luminance changes is equal to or greater than a threshold. When there is a region having a frequency equal to or greater than the threshold, the region determination unit 302 shifts the processing to step S704. On the other hand, when there is no region having a frequency equal to or greater than the threshold, the region determination unit 302 ends the processing in FIG. 7.

In step S704, the region determination unit 302 sets a region where the frequency of luminance changes is equal to or greater than the threshold as a non-monitoring region. In the field of view of the image acquisition unit 301, a region other than the non-monitoring region is the monitoring region.

Suspicious Person Detection Processing

Figure 8:
FIG. 8 is a flowchart illustrating an example of suspicious person detection processing according to the first embodiment.

FIG. 8 is a flowchart illustrating an example of suspicious person detection processing according to the first embodiment. This processing is an example of the suspicious person detection processing executed by the information processing apparatus 101 in step S604 of FIG. 6.

In step S801, the image processor 311 performs image processing such as noise removal on the monitoring result (the image indicating the luminance change) acquired from the monitoring unit 304.

In steps S802 and S803, the AI processor 312 determines whether or not a monitoring target region (e.g., the vehicle cabin of the vehicle 10) is safe in the monitoring result subjected to the image processing by the image processor 311. For example, the AI processor 312 inputs the monitoring result to a machine learning model that has trained in advance so as to predict whether the vehicle cabin is safe based on the monitoring result, and determines whether the vehicle cabin is safe. When the AI processor 312 determines that the vehicle cabin is safe, the information processing apparatus 101 shifts the processing to step S804. On the other hand, when the AI processor 312 determines that the vehicle cabin is not safe, the information processing apparatus 101 shifts the processing to step S805.

In step S804, the information processing apparatus 101 determines that no suspicious person has been detected.

On the other hand, when the processing proceeds to step S805, the authentication unit 313 compares the acquired monitoring result with the authentication information 315 and executes authentication processing of determining whether the person included in the monitoring result is a valid user.

In step S806, when the person included in the monitoring result is a valid user, the information processing apparatus 101 shifts the processing to step S804. On the other hand, when the person included in the monitoring result is not a valid user, the information processing apparatus 101 shifts the processing to step S807.

In step S807, the information processing apparatus 101 determines that a suspicious person has been detected.

The processing of FIG. 8 is an example of a suspicious person detection processing executed by the information processing apparatus 101. For example, the processing of step S801 may be executed by the monitoring unit 304, the AI processor 312, or the like, or may be omitted. In step S805, the authentication unit 313 may authenticate whether or not the person in the vehicle cabin is a valid user by requesting the person in the vehicle 10 to perform biological authentication, password authentication, or the like, instead of (or in addition to) the acquired monitoring result. The authentication processing in step S805 may be omitted.

As described above, according to the first embodiment, in the monitoring system 1 using the EVS as a monitoring camera, the unnecessary monitoring result is prevented from being output by setting the non-monitoring region, and thus it is possible to reduce the power consumption of the information processing apparatus 101.

Second Embodiment

Figure 9:
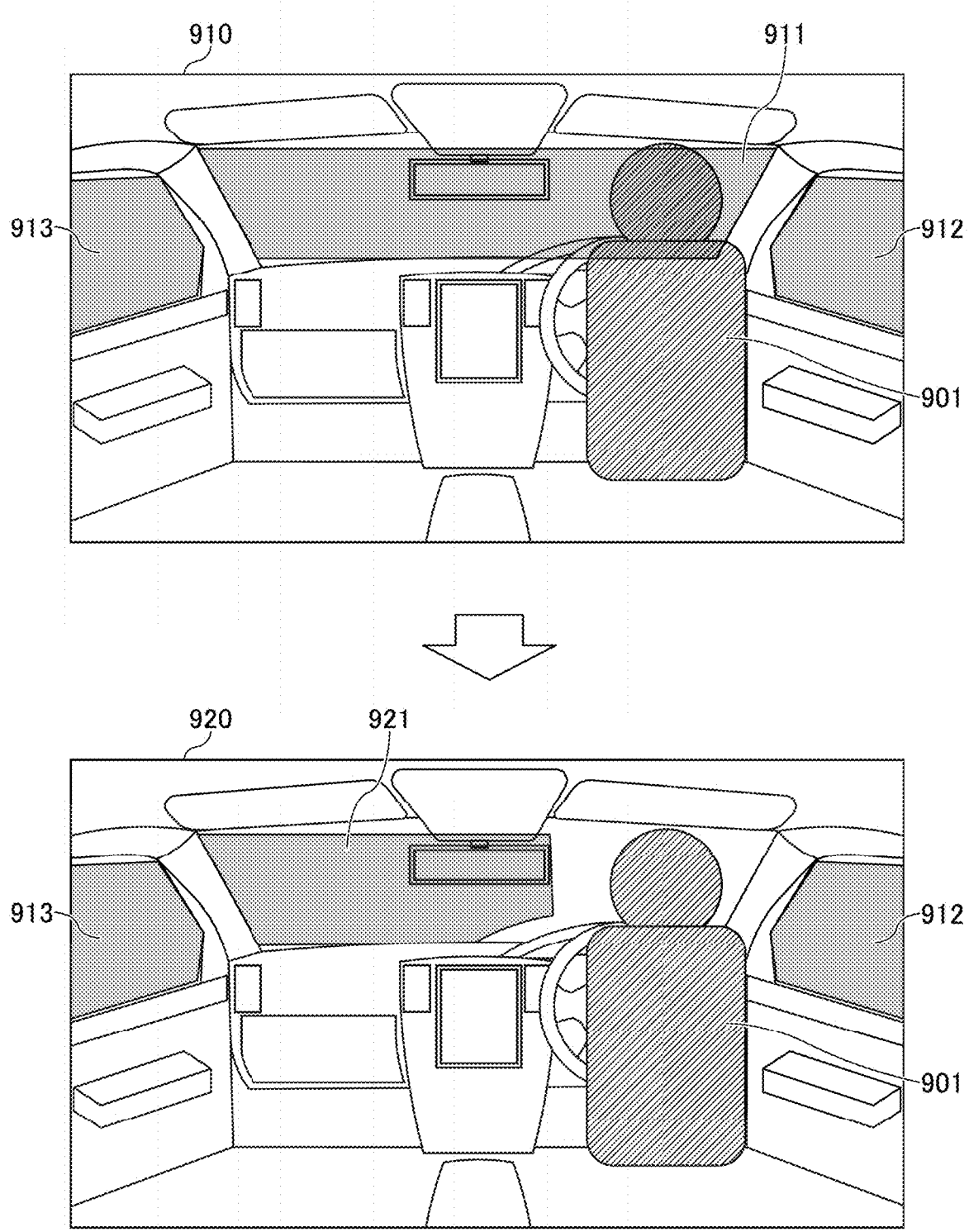
FIG. 9 is a diagram for explaining region change processing according to a second embodiment.

FIG. 9 is a diagram for explaining region change processing according to a second embodiment. An upper diagram 910 of FIG. 9 illustrates an image of the field of view of the image acquisition unit 301. In the upper diagram 910 of FIG. 9, as described in FIG. 2, non-monitoring regions 911, 912, and 913 are set on the windshield, and the left and right side windows of the vehicle 10.

In this state, it is assumed that a moving object (e.g., a suspicious person or the like) 901 is detected in the monitoring region other than the non-monitoring regions 911, 912, and 913, for example. In this case, the monitoring device 100 changes a non-monitoring region (second region) near the moving object 901 to the monitoring region (first region) as illustrated in a lower diagram 920 of FIG. 9.

For example, in the lower diagram 920 of FIG. 9, the monitoring device 100 changes a non-monitoring region in the vicinity of the moving object 901 to a monitoring region by reducing a size of the non-monitoring region 911 in the upper diagram 910 of FIG. 9 to a size of a non-monitoring region 921 in the lower diagram 920 of FIG. 9. However, the present disclosure is not limited to this example, and the monitoring device 100 may change the non-monitoring region in the vicinity of the moving object 901 to the monitoring region by changing the entire non-monitoring region 911 in the lower diagram 920 of FIG. 9 to the monitoring region. Alternatively, the monitoring device 100 may change the non-monitoring region in the vicinity of the moving object 901 to the monitoring region by setting the non-monitoring regions 911, 912, and 913 in the upper diagram 910 of FIG. 9 to the monitoring regions.

The moving object monitored by the monitoring system 1 is not limited to a suspicious person or an object in the vehicle cabin, and may be doors or the like of the vehicle 10, for example. When the right door of the vehicle 10 is opened and closed, the monitoring device 100 may change the non-monitoring region (e.g., the non-monitoring region 912) in the vicinity of the right door to the monitoring region.

Flowchart of Processing

Figure 10:
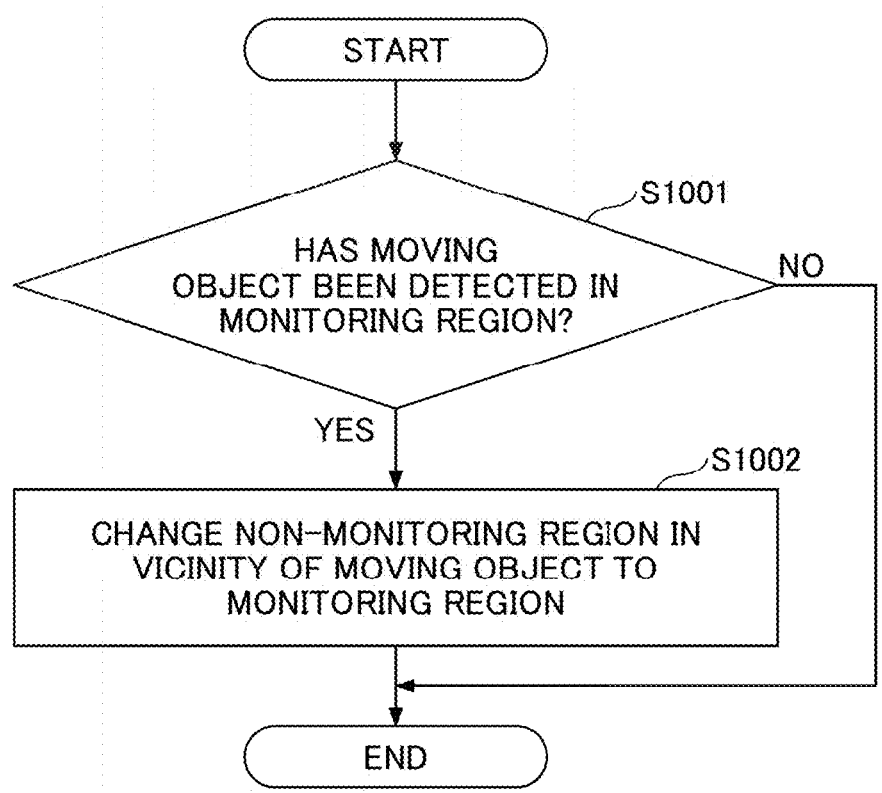
FIG. 10 is a flowchart illustrating an example of region change processing according to the second embodiment.

FIG. 10 is a flowchart illustrating an example of the region change processing according to the second embodiment. The monitoring device 100 according to the second embodiment repeatedly executes, for example, the processing of FIG. 10 in parallel with the monitoring processing according to the first embodiment described with reference to FIG. 6.

In step S1001, the region determination unit 302 determines whether a moving object has been detected in the monitoring region based on an image obtained by the image acquisition unit 301. When no moving object has been detected in the monitoring region, the region determination unit 302 ends (or re-executes) the processing in FIG. 10. On the other hand, when a moving object has been detected in the monitoring region, the region determination unit 302 shifts the processing to step S1002.

In step S1002, the region determination unit 302 changes the non-monitoring region (second region) in the vicinity of the detected moving object to the monitoring region (first region). For example, as described with reference to FIG. 9, the region determination unit 302 reduces a size of the non-monitoring region 911 in the vicinity of the detected moving object 901 to a size of the non-monitoring region 921. However, the present disclosure is not limited to this example, and the region determination unit 302 may set the entire non-monitoring region 911 in the vicinity of the detected moving object 901 in FIG. 9 as the monitoring region. Alternatively, the region determination unit 302 may set all the non-monitoring regions 911, 912, and 913 as the monitoring regions. As described above, in step S1002, the region determination unit 302 may change at least the non-monitoring region near the detected moving object to the monitoring region.

According to the second embodiment, the monitoring system 1 can facilitate the monitoring of the moving object and improve the monitoring accuracy of the moving object.

Third Embodiment

According to a third embodiment, a usage example of warning information output by the information processing apparatus 101 will be described.

Figure 11:
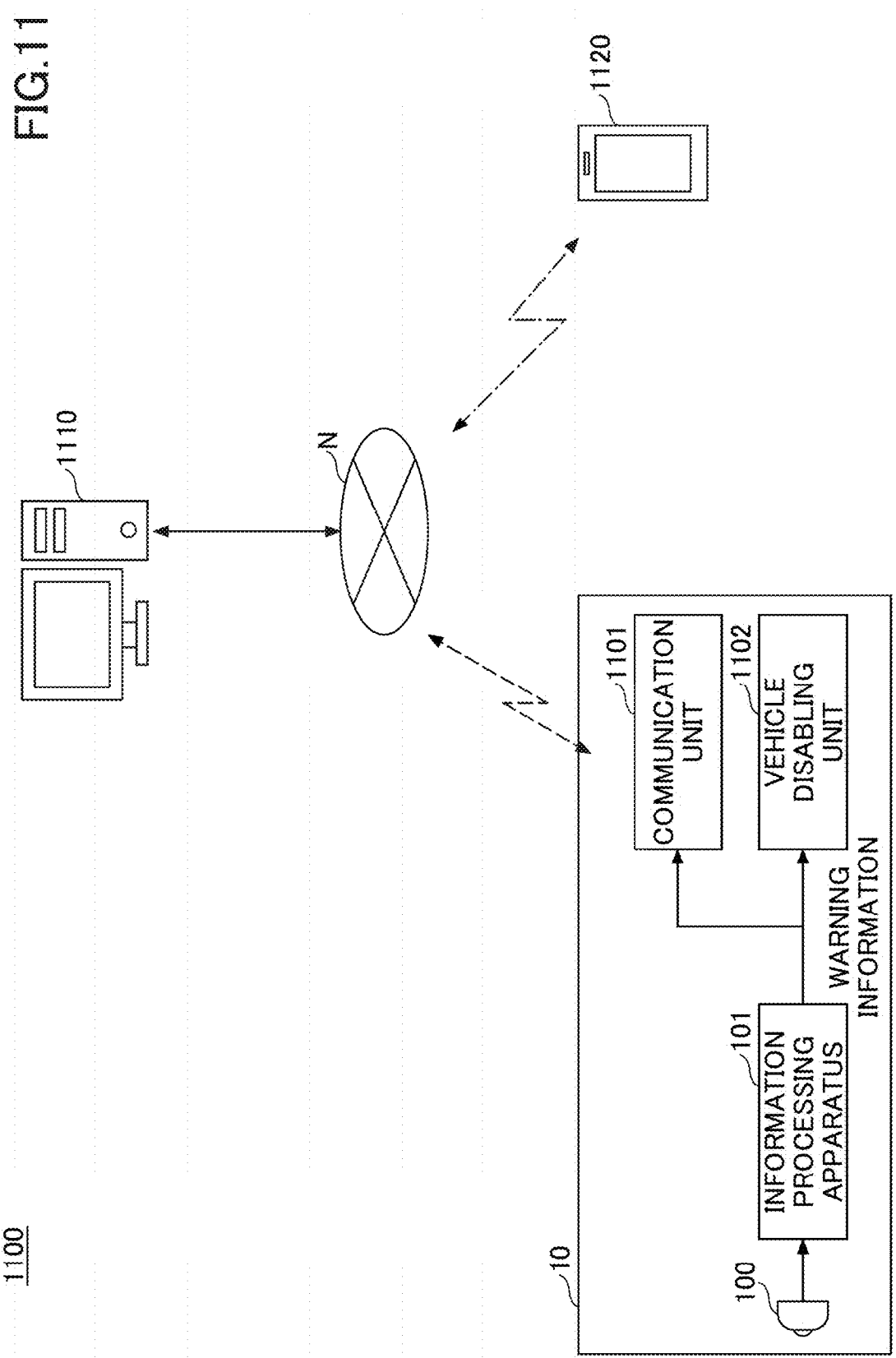
FIG. 11 is a diagram illustrating an example of a system configuration of a monitoring system according to a third embodiment.

FIG. 11 is a diagram illustrating an example of a system configuration of a monitoring system according to a third embodiment. In the example of FIG. 11, the vehicle 10 includes a communication unit 1101 and a vehicle disabling unit 1102 in addition to the monitoring device 100 and the information processing apparatus 101. Here, the monitoring device 100 and the information processing apparatus 101 are, for example, the monitoring device 100 and the information processing apparatus 101 according to the first embodiment or the second embodiment.

The communication unit 1101 is implemented by, for example, an electronic control unit (ECU) included in the vehicle 10, a wireless communication module that connects the vehicle 10 to the communication network N, and the like. When the communication unit 1101 receives warning information from the information processing apparatus 101, the communication unit 1101 notifies the owner of the vehicle 10 or a predetermined notification destination such as a security company set in advance that a moving object (suspicious person or the like) is present in the vehicle 10 via an external server 1110.

Thus, the monitoring system 1 according to the third embodiment can promptly notify the predetermined notification destination that there is a risk of the vehicle 10 being stolen. The information processing apparatus 101 may have the function of the communication unit 1101.

The vehicle disabling unit 1102 is implemented by, for example, an electronic control unit or the like included in the vehicle 10, and disables the vehicle 10 (sets the vehicle 10 to an inoperable state) when warning information is received from the information processing apparatus 101. For example, the vehicle disabling unit 1102 may prevent the engine of the vehicle 10 from starting or may destroy some of the components of the vehicle 10 (e.g., cutting a fuse, cutting an e-fuse in a semiconductor chip, or the like), through software processing.

This allows the vehicle 10 to be in an inoperable state, and therefore, even if the vehicle 10 is stolen, the economic value of the vehicle 10 when sold and bought is reduced. This can reduce the motivation for the vehicle theft. Note that the owner (authorized user) of the vehicle 10 can bring the disabled vehicle 10 to an authorized dealer or the like and replace the destroyed components or perform batch processing of software, thereby restoring the vehicle 10 to be in an operable state.

In this way, the information processing apparatus 101 controls the disabling of the vehicle 10 based on the monitoring result of the moving object in the vehicle cabin by using the vehicle disabling unit 1102. The information processing apparatus 101 may have the function of the vehicle disabling unit 1102.

The vehicle 10 may include either the communication unit 1101 or the vehicle disabling unit 1102. In the vehicle 10, it is desirable that the user can configure as to whether or not to enable the function of the vehicle disabling unit 1102.

Example of Usage Scene

In the first to third embodiments, the monitoring system 1 detects intrusion of a suspicious person into the vehicle 10. However, the present disclosure is not limited to this example, and the monitoring system 1 can be applied to various other applications.

For example, the monitoring system 1 can be applied to a watching purpose for notifying a driver who has locked the vehicle 10 or a predetermined notification destination such as a security company that there is a passenger left in the vehicle 10 when a moving object is detected in the vehicle 10 after the vehicle 10 has been locked.

The present embodiment is not limited to being applied to the inside of the vehicle 10, and can be applied to a monitoring camera or the like installed indoors or outdoors, for example.

Figure 12:
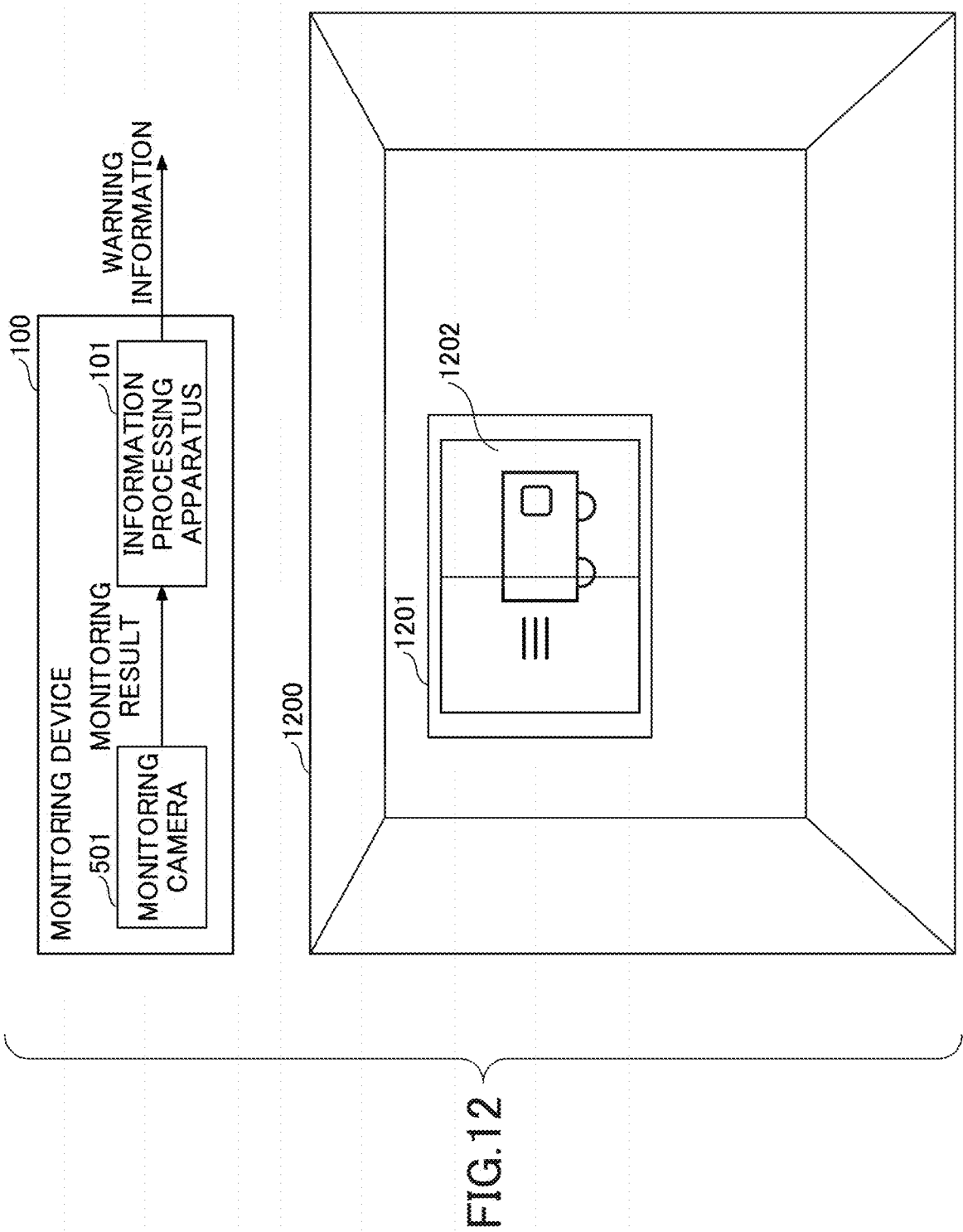
FIG. 12 is a diagram illustrating an example of a usage scene of a monitoring system according to an embodiment.

FIG. 12 is a diagram illustrating an example of a usage scene of the monitoring system according to the embodiment. For example, the monitoring system 1 may be configured such that the monitoring device 100 including the monitoring camera 501 and the information processing apparatus 101 is installed indoors to monitor a moving object (e.g., a suspicious person) indoors.

A reference numeral 1200 in FIG. 12 indicates an image of the field of view of the image acquisition unit 301 (or EVS) of the monitoring device 100. In this example, the monitoring device 100 is installed indoors so that the indoor including a window 1201 is within the field of view of the image acquisition unit 301.

In this case, the monitoring device 100 sets the window 1201 which is not a monitoring target and has outdoor movement as the non-monitoring region 1202, and thus can monitor an indoor moving object (e.g., intrusion of a suspicious person) while suppressing power consumption of the information processing apparatus 101. The monitoring device 100 is not limited to the window 1201, and can set a region with movement, such as a screen of a television or the like, a water tank for aquarium fish, or a pet cage, as the non-monitoring region.

Hardware Configuration

Figure 13:
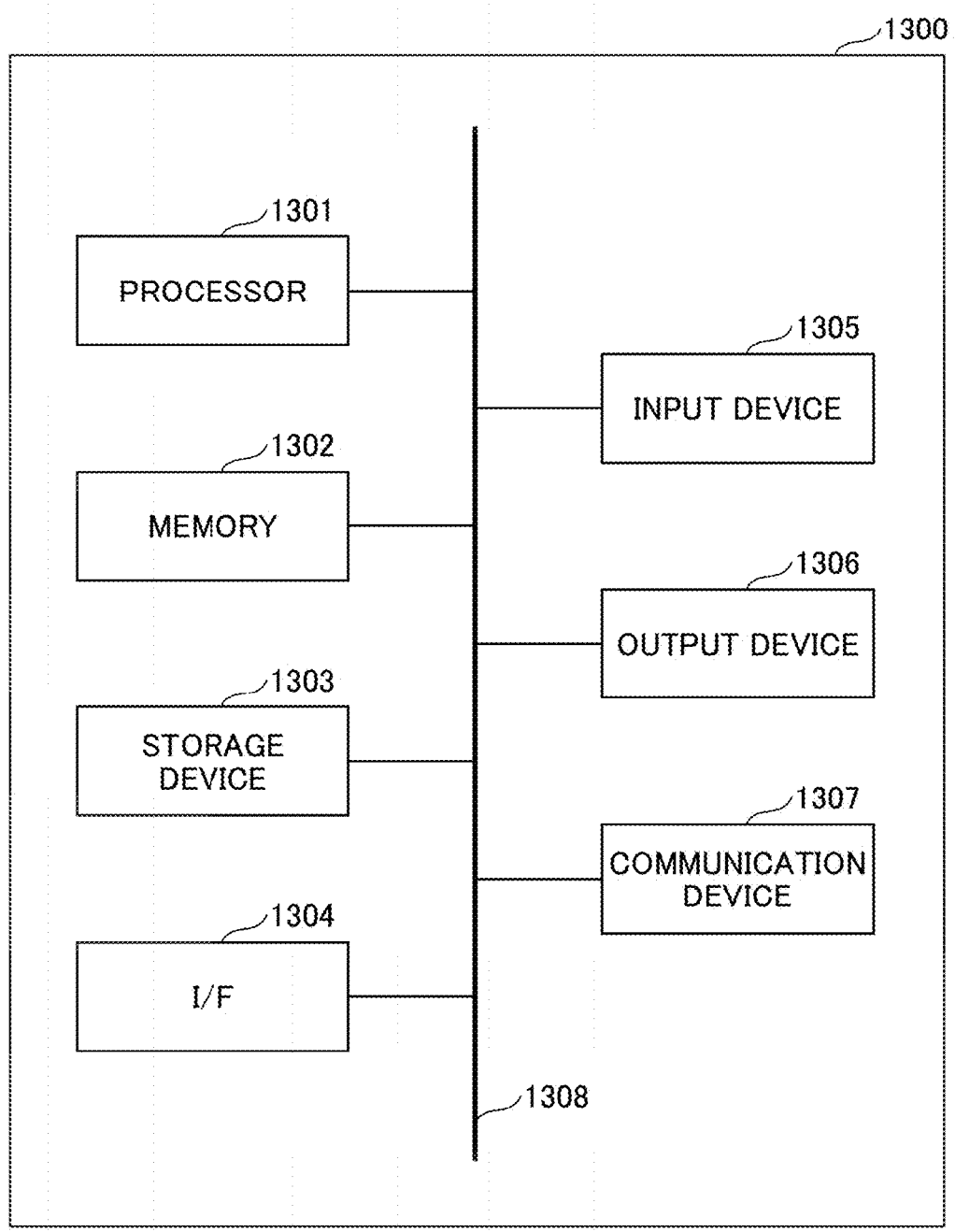
FIG. 13 is a diagram illustrating an example of a hardware configuration of a computer according to an embodiment.

The information processing apparatus 101 in FIG. 3 and the monitoring device 100 in FIG. 5 have a hardware configuration of a computer 1300 as illustrated in FIG. 13, for example.

FIG. 13 is a diagram illustrating an example of a hardware configuration of a computer according to an embodiment. The computer 1300 includes, for example, a processor 1301, a memory 1302, a storage device 1303, an interface (I/F) 1304, an input device 1305, an output device 1306, a communication device 1307, and a bus 1308.

The processor 1301 is, for example, an arithmetic-logic unit such as a central processing unit (CPU) that executes a program stored in a storage medium such as the storage device 1303 to execute a predetermined process. The memory 1302 includes, for example, a random access memory (RAM) which is a volatile memory used as a work area or the like of the processor 1301, a read only memory (ROM) which is a nonvolatile memory storing a program for activating the processor 1301, and the like. The storage device 1303 is a large-capacity nonvolatile storage such as a solid state drive (SSD) or a hard disk drive (HDD). The I/F 1304 includes various interfaces for connecting external devices to the computer 1300.

The input device 1305 includes various devices (e.g., a keyboard, a touch panel, a pointing device, a microphone, a switch, a button, a sensor, or the like) that receive an input from the outside. The output device 1306 includes various devices (e.g., a display, a speaker, an indicator, and the like) that perform output to the outside. The communication device 1307 includes various communication devices for performing communication with other devices via a wired or wireless network. The bus 1308 is connected to the above-described components and transmits, for example, an address signal, a data signal, and various control signals.

As described above, according to each embodiment of the present disclosure, a sufficient power saving effect can be obtained in a monitoring system using an EVS as a monitoring camera.

Although the embodiments of the present disclosure have been described above, the present disclosure is not limited to such specific embodiments, and various modifications or alterations can be made within the scope of the gist of the present disclosure described in the claims.

What is claimed is:

1. A monitoring device comprising:
a memory; and
a processor configured to execute a process including:
acquiring image data indicating a change in intensity of incident light from a sensor array, the change in the intensity of the incident light including a luminance change;
determining, as a first region to be monitored, a region where a frequency of the luminance changes is less than a threshold in the image data acquired by the sensor array;
determining, as a second region not to be monitored in a field of view of the sensor array, a region where the frequency of the luminance changes is equal to or greater than the threshold in the image data acquired by the sensor array; and outputting a monitoring result of a moving object based on the image data acquired by the sensor array in the first region.

2. The monitoring device according to claim 1, wherein the process further includes
shielding a predetermined region in the field of view of the sensor array; and
controlling the predetermined region so as to shield the second region from light in the field of view of the sensor array.

3. The monitoring device according to claim 1, wherein in response to the outputting including detecting of a moving object in the first region, the determining includes changing the second region near the moving object to the first region.

4. A monitoring system comprising:
a monitoring device; and
an information processing apparatus,
wherein the monitoring device comprises:
a memory; and
a processor configured to execute a process including:
acquiring image data indicating a change in intensity of incident light from a sensor array, the change in the intensity of the incident light including a luminance change;
determining, as a first region to be monitored, a region where a frequency of the luminance changes is less than a threshold in the image data acquired by the sensor array;
determining, as a second region not to be monitored in a field of view of the sensor array, a region where the frequency of the luminance changes is equal to or greater than the threshold in the image data acquired by the sensor array; and
outputting a monitoring result of a moving object based on the image data acquired by the sensor array in the first region to the information processing apparatus.

5. The monitoring system according to claim 4, wherein the information processing apparatus outputs predetermined warning information based on a detection result of the moving object.

6. The monitoring system according to claim 4,
wherein the monitoring device is a monitoring camera installed in a vehicle, and
wherein the information processing apparatus controls disabling of the vehicle based on the monitoring result of the moving object.

7. The monitoring system according to claim 6, wherein the information processing apparatus is an electronic control unit provided in the vehicle.

8. The monitoring system according to claim 4, wherein the process further includes
shielding a predetermined region in the field of view of the sensor array; and
controlling the predetermined region so as to shield the second region from light in the field of view of the sensor array.

9. The monitoring system according to claim 4, wherein in response to the outputting including detecting of a moving object in the first region, the determining includes changing the second region near the moving object to the first region.

10. A monitoring method performed by a monitoring device, the monitoring device including a memory, and a processor configured to execute the monitoring method, the monitoring method comprising:
acquiring, by a sensor array, image data indicating a change in intensity of incident light;
determining, as a first region to be monitored, a region where a frequency of the luminance changes is less than a threshold in the image data acquired by the sensor array;
determining, as a second region not to be monitored in a field of view of the sensor array, a region where the frequency of the luminance changes is equal to or greater than the threshold in the image data acquired by the sensor array; and
outputting a monitoring result of a moving object based on the image data acquired in the acquiring in the first region.

11. The monitoring method according to claim 10, further comprising:
shielding a predetermined region in the field of view of the sensor array; and
controlling the predetermined region so as to shield the second region from light in the field of view of the sensor array.

12. The monitoring method according to claim 10, wherein in response to the outputting including detecting of a moving object in the first region, the determining includes changing the second region near the moving object to the first region.

13. The monitoring method according to claim 10, wherein the monitoring result is output to an information processing apparatus.

14. The monitoring method according to claim 13, wherein the information processing apparatus outputs predetermined warning information based on a detection result of the moving object.

15. The monitoring method according to claim 13,
wherein the monitoring device is a monitoring camera installed in a vehicle, and
wherein the method comprises controlling disabling of the vehicle based on the monitoring result of the moving object.

16. The monitoring method according to claim 15, wherein the information processing apparatus is an electronic control unit provided in the vehicle.

* * * * *